(12) United States Patent
Liu

(10) Patent No.: US 10,735,921 B2
(45) Date of Patent: Aug. 4, 2020

(54) FIREMAN POSITIONING SYSTEM

(71) Applicant: Man-Chee Liu, Taipei (TW)

(72) Inventor: Man-Chee Liu, Taipei (TW)

( * ) Notice: Subject to any disclaimer, the term of this patent is extended or adjusted under 35 U.S.C. 154(b) by 0 days.

(21) Appl. No.: 16/450,944

(22) Filed: Jun. 24, 2019

(65) Prior Publication Data

US 2020/0021957 A1   Jan. 16, 2020

(30) Foreign Application Priority Data

Jul. 16, 2018   (TW) .............................. 107124528 A

(51) Int. Cl.
| | |
|---|---|
| *H04W 4/33* | (2018.01) |
| *H04W 4/02* | (2018.01) |
| *A62C 99/00* | (2010.01) |
| *H04W 64/00* | (2009.01) |
| *H04W 4/029* | (2018.01) |

(52) U.S. Cl.
CPC ............ *H04W 4/33* (2018.02); *A62C 99/009* (2013.01); *H04W 4/025* (2013.01); *H04W 4/029* (2018.02); *H04W 64/003* (2013.01)

(58) Field of Classification Search
CPC ....... H04W 4/33; H04W 4/029; H04W 4/025; H04W 64/003; A62C 99/009
USPC .............................. 340/539.1, 539.11, 539.13
See application file for complete search history.

(56) References Cited

U.S. PATENT DOCUMENTS

| | | | | |
|---|---|---|---|---|
| 5,999,131 | A * | 12/1999 | Sullivan ................... | G01S 1/045 342/465 |
| 6,239,748 | B1 * | 5/2001 | Gilhousen ................. | G01S 5/06 342/442 |
| 6,492,906 | B1 * | 12/2002 | Richards ................. | G01S 13/42 340/573.1 |
| 6,965,344 | B1 * | 11/2005 | Halsey .................... | G08B 21/02 342/442 |
| 2005/0289162 | A1 * | 12/2005 | Saitta ........................ | A62B 3/00 |
| 2009/0243932 | A1 * | 10/2009 | Moshfeghi ................ | G01S 5/14 342/378 |
| 2009/0325598 | A1 * | 12/2009 | Guigne .................... | G01S 5/021 455/456.1 |
| 2012/0286992 | A1 * | 11/2012 | Tekin ....................... | G01S 19/11 342/357.48 |
| 2014/0302869 | A1 * | 10/2014 | Rosenbaum .......... | H04W 4/026 455/456.1 |

(Continued)

*Primary Examiner* — Daryl C Pope
(74) *Attorney, Agent, or Firm* — Guice Patents PLLC

(57) ABSTRACT

A fireman positioning system includes: a first radio wave emitting device and a second radio wave emitting device, spaced with a predetermined distance and utilized for correspondingly emitting a first frequency modulated signal and a second frequency modulated signal; and a position receiving device, carried or worn by a fireman, and utilized for receiving the first frequency modulating signal and the second frequency modulating signal, and can demodulate the first frequency modulated signal via a first carrier signal so as to obtain a first output signal, and demodulate the second frequency modulated signal via a second carrier signal so as to obtain a second output signal, wherein a phase difference is formed between the first output signal and the second output signal, and the position receiving device can determine a direction angle of the fireman relative to the two radio wave emitting devices via the phase difference.

10 Claims, 4 Drawing Sheets

(56) References Cited

U.S. PATENT DOCUMENTS

| | | | | |
|---|---|---|---|---|
| 2015/0318624 A1* | 11/2015 | Schantz | ............... | G01S 5/14 |
| | | | | 343/867 |
| 2018/0074161 A1* | 3/2018 | Rosenbaum | .......... | G01S 13/426 |
| 2018/0367952 A1* | 12/2018 | Devdas | ................ | H04W 4/029 |

\* cited by examiner

FIREMAN POSITIONING SYSTEM

BACKGROUND OF THE INVENTION

1. Field of the Invention

The present invention relates to a fireman positioning system.

2. Description of Related Art

When a building is on fire, there may be no electricity available inside the building and smoke would occupy most of the indoor space, so that a fireman is unable to clearly know his/her current location inside the building.

For solving the above-mentioned problem, the fireman needs a positioning device.

The global positioning system (GPS) can provide a positioning function in an opened space, but the above-mentioned function cannot be applied in an indoor space.

For solving the indoor positioning problem, the Apple Inc. has launched the iBeacon positioning project in 2013. The positioning project utilizes a signal emitter to continuously emitting signals, when a mobile phone is within a coverage range of the signal emitter, a string of codes is sent by the signal emitter to the mobile phone for enabling the mobile phone to be provided with a positioning data.

However, during a fire accident, the signal emitter of the iBeacon would very likely stop its operation because there is no electricity, and the fireman is unable to obtain the positioning data when he/she is in the indoor space.

For solving the above-mentioned problems, a novel indoor positioning system for fireman shall be developed by the skilled people in the art.

SUMMARY OF THE INVENTION

One primary objective of the present invention is to disclose a fireman positioning system, in which a plurality of radio wave emitting devices are disposed at a periphery of a fire scene for assisting a fireman to determine his/her three-dimensional location at the fire scene.

Another objective of the present invention is to disclose a fireman positioning system, in which a plurality of radio wave emitting are devices disposed in a fire vehicle for allowing a fireman to determine his/her three-dimensional location at a fire scene through a position receiving device receiving a plurality of radio wave signals.

For achieving said objectives, one technical solution provided by the present invention is to provide a fireman positioning system, which includes: a first radio wave emitting device and a second radio wave emitting device, spaced with a predetermined distance and utilized for correspondingly emitting a first frequency modulated signal and a second frequency modulated signal, wherein the first frequency modulated signal is generated through a baseband signal processing a modulating calculation to a first carrier signal, the second frequency modulated signal is generated through the baseband signal processing a modulating calculation to a second carrier signal, the first carrier signal and the second carrier signal respectively have a first frequency and a second frequency, and the first frequency is different from the second frequency; and a position receiving device, carried or worn by a fireman, and utilized for receiving the first frequency modulating signal and the second frequency modulating signal, and served to demodulate the first frequency modulated signal via the first carrier signal so as to obtain a first output signal, and demodulate the second frequency modulated signal via the second carrier signal so as to obtain a second output signal, wherein a phase difference is formed between the first output signal and the second output signal, and the position receiving device is served to determine a direction angle of the fireman relative to the two radio wave emitting devices via the phase difference.

According to one embodiment of the present invention, the position receiving device includes a displayer and/or a speaker.

According to one embodiment of the present invention, the position receiving device includes a button unit and/or a touch control unit.

According to one embodiment of the present invention, the position receiving device includes a communication interface.

According to one embodiment of the present invention, the two radio wave emitting devices are disposed in a fire vehicle.

According to one embodiment of the present invention, the first frequency and the second frequency are both equal to or smaller than 1 GHz.

For achieving said objectives, another technical solution provided by the present invention is to provide a fireman positioning system, which includes: N radio wave emitting devices, disposed at N corners of a space having N sides for emitting N different frequency modulated signals, wherein N is an integer equal to or greater than 3; and a position receiving device, carried or worn by a fireman, and utilized for receiving the N different frequency modulated signals, wherein the position receiving device is served to demodulate the N different frequency modulated signals via N different carrier signals so as to obtain N different output signals, a phase difference detection is processed to any two of the N different output signals so as to obtain $N*(N-1)/2$ different phase differences, and the position receiving device is served to determine a three-dimensional location of the fireman relative to the N radio wave emitting devices according to at least two of the $N*(N-1)/2$ different phase differences.

According to one embodiment of the present invention, the position receiving device includes an information outputting unit, an operation interface and a communication interface.

According to one embodiment of the present invention, N different frequencies of the N different carrier signals are all equal to or smaller than 1 GHz.

According to one embodiment of the present invention, the N radio wave emitting devices are disposed in a fire vehicle.

BRIEF DESCRIPTION OF THE DRAWINGS

The present invention will be apparent to those skilled in the art by reading the following detailed description of a preferred embodiment thereof, with reference to the attached drawings, in which.

DETAILED DESCRIPTION OF THE PREFERRED EMBODIMENT

Figure 1:
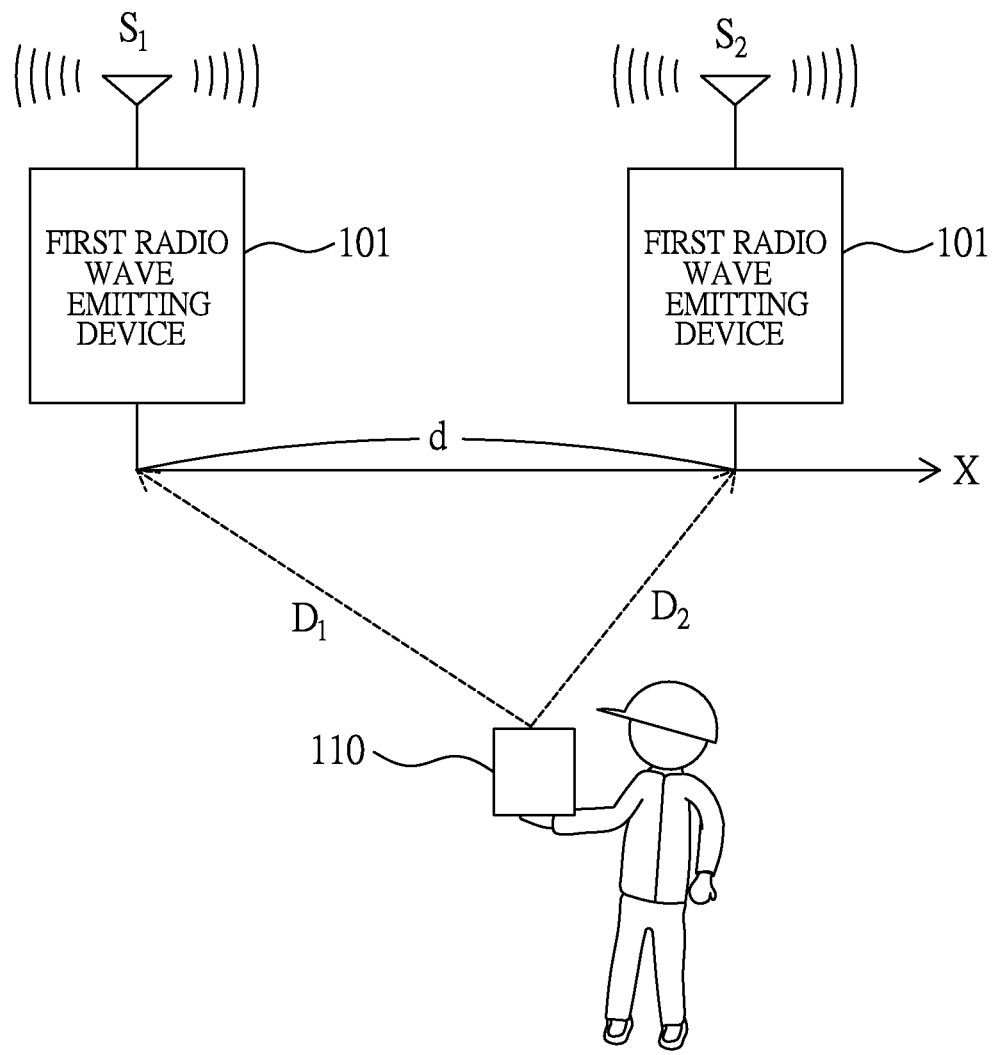
FIG. 1 is a schematic view illustrating the fireman positioning system according to one embodiment of the present invention.

Please refer to FIG. 1, which is a schematic view illustrating the fireman positioning system according to one embodiment of the present invention; As show in FIG. 1, a fireman positioning system including two first radio wave emitting devices 101 and a position receiving device 110 is disclosed in the present invention. The two first radio wave emitting devices 101 are spaced with a predetermined distance d in a first direction X and respectively utilized for emitting a first radio wave signal S1 and a second radio wave signal S2. The position receiving device 110 is carried or worn by a fireman.

The first radio wave signal S1 has a first frequency modulated signal generated through a first baseband signal processing a modulating calculation to a first carrier signal, the second radio wave signal S2 has a second frequency modulated signal generated through the first baseband signal processing a modulating calculation to a second carrier signal. The first carrier signal and the second carrier signal respectively have a first frequency and a second frequency, and the first frequency is different from the second frequency. Wherein, the modulating calculation can be a frequency modulating calculation, an amplitude modulating calculation or a phase modulating calculation.

The position receiving device 110 is carried or worn by the fireman, and utilized for receiving the first frequency modulating signal and the second frequency modulating signal, and served to demodulate the first frequency modulated signal via the first carrier signal so as to obtain a first output signal, and demodulate the second frequency modulated signal via the second carrier signal so as to obtain a second output signal. Wherein, a first phase difference is formed between the first output signal and the second output signal, the first phase difference is determined through a distance difference (D1-D2) defined by distances between the fireman and the two first radio wave emitting devices 101, and the position receiving device 110 is served to determine a direction angle of the fireman relative to the two first radio wave emitting devices 101 via the first phase difference.

Figure 2:
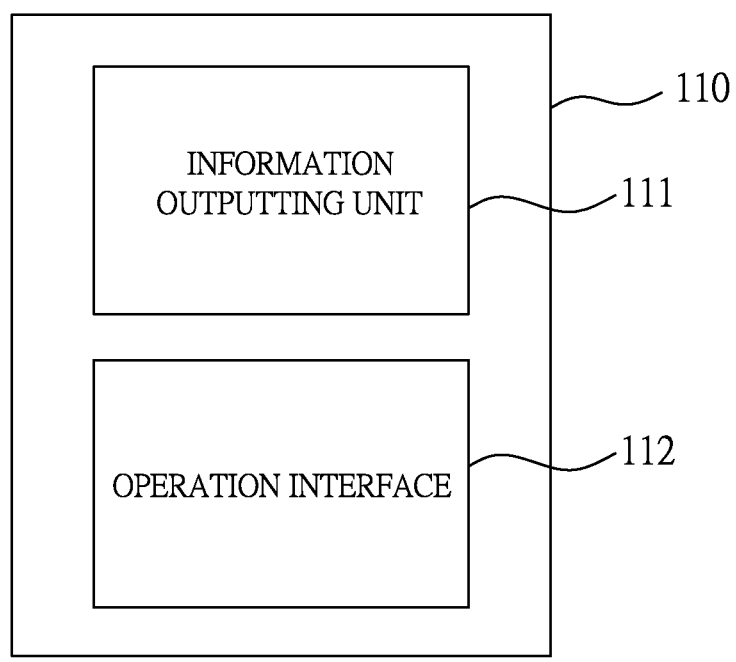
FIG. 2 is a block diagram illustrating view illustrating the position receiving device of the fireman positioning system of FIG. 1 according to one embodiment of the present invention.

Please refer to FIG. 2, which is a block diagram illustrating view illustrating the position receiving device 110 of the fireman positioning system of FIG. 1 according to one embodiment of the present invention. As shown in FIG. 2, the position receiving device 110 has an information outputting unit 111 and an operation interface 112.

The information outputting unit 111 has a displayer and/or a speaker.

The operation interface 112 has a button unit and/or a touch control unit.

According to one preferred embodiment, the position receiving device 110 has a communication interface utilized for communicating with an external device and/or transmitting position information.

According to one preferred embodiment, the two first radio wave emitting devices 101 is disposed in a fire vehicle.

According to one preferred embodiment, the first frequency and the second frequency are both equal to or smaller than 1 GHz.

Figure 3:
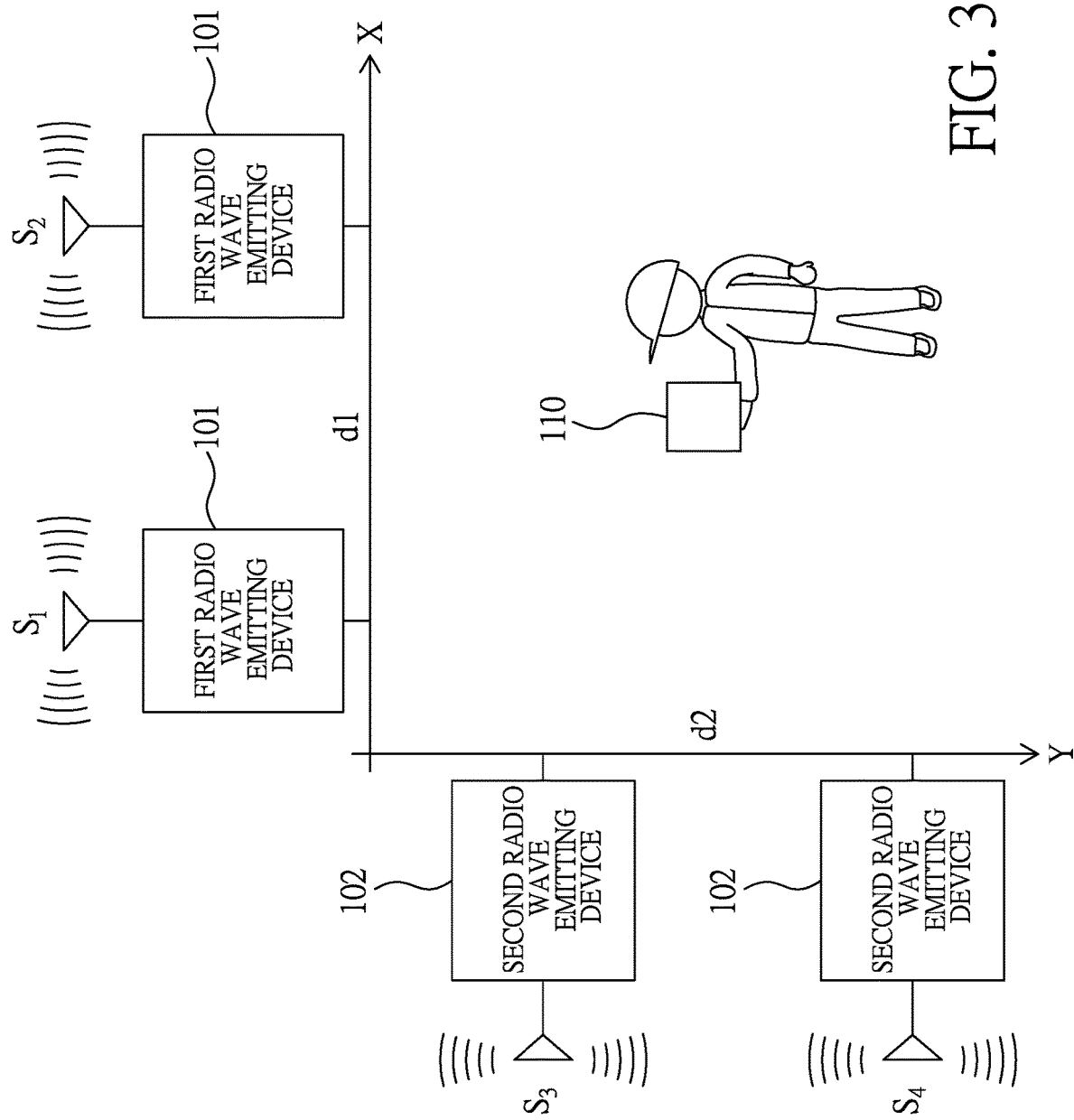
FIG. 3 is a schematic view illustrating the fireman positioning system according to another embodiment of the present invention.

Please refer to FIG. 3, which is schematic view illustrating the fireman positioning system according to another embodiment of the present invention. As shown in FIG. 3, the fireman positioning system includes two first radio wave emitting devices 101, two second radio wave emitting devices 102 and a position receiving device 110. The two first radio wave emitting devices 101 are spaced with a predetermined distance dl in a first direction X and respectively utilized for emitting a first radio wave signal S1 and a second radio wave signal S2. The two second radio wave emitting devices 102 are spaced with a predetermined distance d2 in a second direction Y and respectively utilized for emitting a third radio wave signal S3 and a fourth radio wave signal S4. The second direction Y is different from the first direction X. The position receiving device 110 is carried or worn by a fireman.

The first radio wave signal S1 has a first frequency modulated signal generated through a first baseband signal processing a modulating calculation to a first carrier signal, the second radio wave signal S2 has a second frequency modulated signal generated through the first baseband signal processing a modulating calculation to a second carrier signal. The first carrier signal and the second carrier signal respectively have a first frequency and a second frequency, and the first frequency is different from the second frequency. Wherein, the modulating calculation can be a frequency modulating calculation, an amplitude modulating calculation or a phase modulating calculation.

The third radio wave signal S3 has a third frequency modulated signal generated through a second baseband signal processing a modulating calculation to a third carrier signal, the fourth radio wave signal S4 has a fourth frequency modulated signal generated through the second baseband signal processing a modulating calculation to a fourth carrier signal. The third carrier signal and the fourth carrier signal respectively have a third frequency and a fourth frequency, and the third frequency is different from the fourth frequency.

The position receiving device 110 is utilized for receiving and demodulating the first frequency modulating signal, the second frequency modulating signal, the third frequency modulating signal and the fourth frequency modulating signal. The position receiving device 110 is served to demodulate the first frequency modulated signal via the first carrier signal so as to obtain a first output signal, and demodulate the second frequency modulated signal via the second carrier signal so as to obtain a second output signal. Wherein, a first phase difference is formed between the first output signal and the second output signal, the first phase difference is determined through a distance difference defined by distances between the fireman and the two first radio wave emitting devices 101, and the position receiving device 110 is served to determine a first direction angle of the fireman relative to the two first radio wave emitting devices 101 via the first phase difference; and the position receiving device 110 is served to demodulate the third frequency modulated signal via the third carrier signal so as to obtain a third output signal, and demodulate the fourth frequency modulated signal via the fourth carrier signal so as to obtain a fourth output signal. Wherein, a second phase difference is formed between the third output signal and the fourth output signal, the second phase difference is determined through a distance difference defined by distances between the fireman and the two second radio wave emitting devices 102, and the position receiving device 110 is served to determine a second direction angle of the fireman relative to the two second radio wave emitting devices 102 via the second phase difference. Accordingly, the fireman positioning system provided by the present invention can determine a planar location of a fireman at a fire scene according to the first direction angle and the second direction angle.

Figure 4:
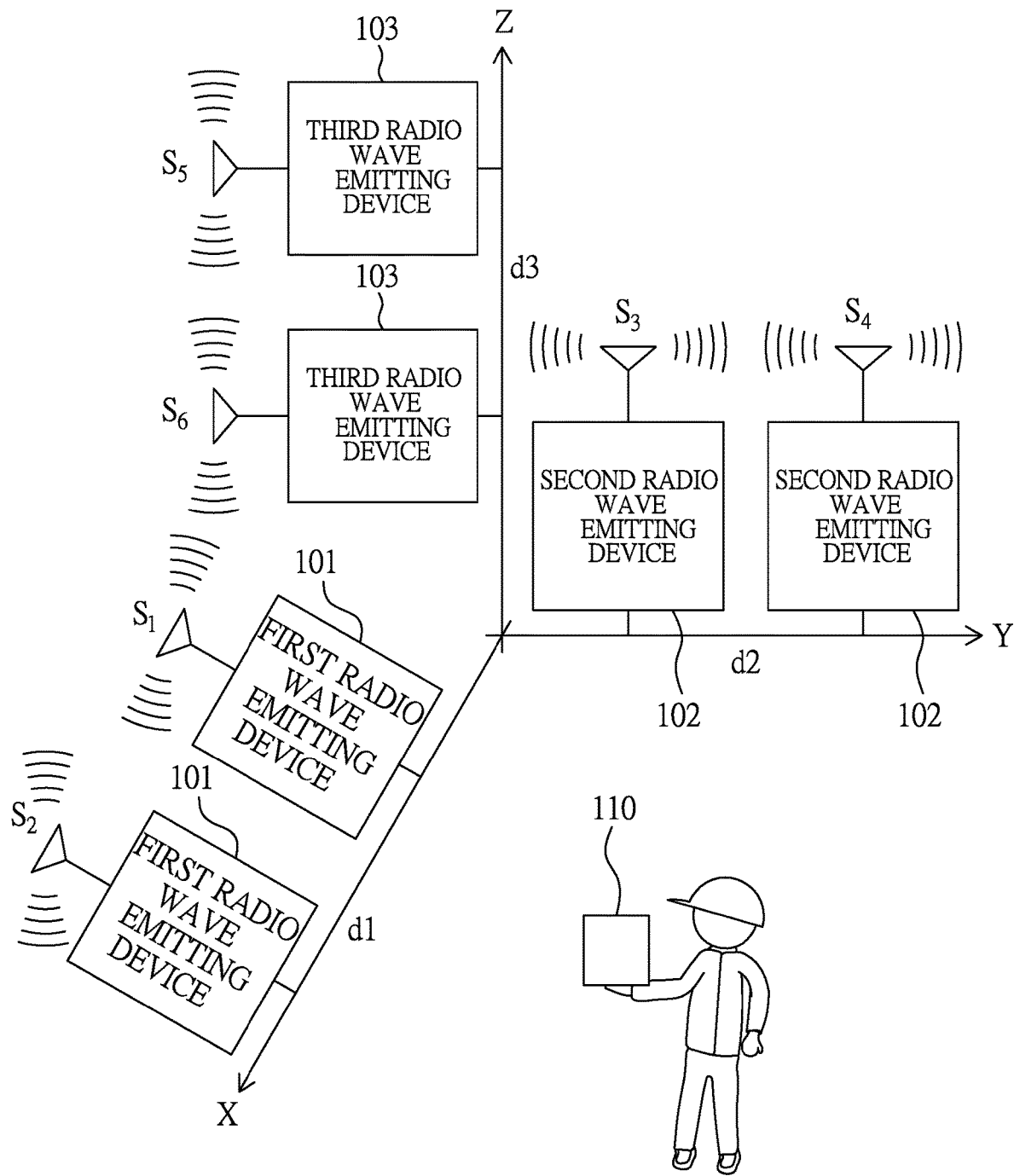
FIG. 4 is a schematic view illustrating the fireman positioning system according to still another embodiment of the present invention.

Please refer to FIG. 4, which is a schematic view illustrating the fireman positioning system according to still another embodiment of the present invention. As shown in FIG. 4, the fireman positioning system includes two first radio wave emitting devices 101, two second radio wave emitting devices 102, two third radio wave emitting devices 103 and a position receiving device 110. The two first radio wave emitting devices 101 are spaced with a predetermined distance dl in a first direction X and respectively utilized for emitting a first radio wave signal S1 and a second radio wave signal S2. The two second radio wave emitting devices 102 are spaced with a predetermined distance d2 in a second direction Y and respectively utilized for emitting a third radio wave signal S3 and a fourth radio wave signal S4. The second direction Y is different from the first direction X. The two third radio wave emitting devices 103 are spaced with a predetermined distance d3 in a third direction Z and respectively utilized for emitting a fifth radio wave signal S5 and a sixth radio wave signal S6. The third direction Z is different from the second direction Z and the first direction X. The position receiving device 110 is carried or worn by a fireman.

The first radio wave signal S1 has a first frequency modulated signal generated through a first baseband signal processing a modulating calculation to a first carrier signal, the second radio wave signal S2 has a second frequency modulated signal generated through the first baseband signal processing a modulating calculation to a second carrier signal. The first carrier signal and the second carrier signal respectively have a first frequency and a second frequency, and the first frequency is different from the second frequency. Wherein, the modulating calculation can be a frequency modulating calculation, an amplitude modulating calculation or a phase modulating calculation.

The third radio wave signal S3 has a third frequency modulated signal generated through a second baseband signal processing a modulating calculation to a third carrier signal, the fourth radio wave signal S4 has a fourth frequency modulated signal generated through the second baseband signal processing a modulating calculation to a fourth carrier signal. The third carrier signal and the fourth carrier signal respectively have a third frequency and a fourth frequency, and the third frequency is different from the fourth frequency.

The fifth radio wave signal S5 has a fifth frequency modulated signal generated through a third baseband signal processing a modulating calculation to a fifth carrier signal, the sixth radio wave signal S6 has a sixth frequency modulated signal generated through the third baseband signal processing a modulating calculation to a sixth carrier signal. The fifth carrier signal and the sixth carrier signal respectively have a fifth frequency and a sixth frequency, and the fifth frequency is different from the sixth frequency.

The position receiving device 110 is utilized for receiving and demodulating the first frequency modulating signal, the second frequency modulating signal, the third frequency modulating signal, the fourth frequency modulating signal, the fifth frequency modulating signal and the sixth frequency modulating signal. The position receiving device 110 is served to demodulate the first frequency modulated signal via the first carrier signal so as to obtain a first output signal, and demodulate the second frequency modulated signal via the second carrier signal so as to obtain a second output signal. Wherein, a first phase difference is formed between the first output signal and the second output signal, the first phase difference is determined through a distance difference defined by distances between the fireman and the two first radio wave emitting devices 101, and the position receiving device 110 is served to determine a first direction angle of the fireman relative to the two first radio wave emitting devices 101 via the first phase difference; the position receiving device 110 is served to demodulate the third frequency modulated signal via the third carrier signal so as to obtain a third output signal, and demodulate the fourth frequency modulated signal via the fourth carrier signal so as to obtain a fourth output signal. Wherein, a second phase difference is formed between the third output signal and the fourth output signal, the second phase difference is determined through a distance difference defined by distances between the fireman and the two second radio wave emitting devices 102, and the position receiving device 110 is served to determine a second direction angle of the fireman relative to the two second radio wave emitting devices 102 via the second phase difference; and the position receiving device 110 is served to demodulate the fifth frequency modulated signal via the fifth carrier signal so as to obtain a fifth output signal, and demodulate the sixth frequency modulated signal via the sixth carrier signal so as to obtain a sixth output signal. Wherein, a third phase difference is formed between the fifth output signal and the sixth output signal, the third phase difference is determined through a distance difference defined by distances between the fireman and the two third radio wave emitting devices 103, and the position receiving device 110 is served to determine a third direction angle of the fireman relative to the two third radio wave emitting devices 103 via the third phase difference. Accordingly, the fireman positioning system provided by the present invention can determine a three-dimensional location of a fireman at a fire scene according to the first direction angle, the second direction angle and the third direction angle.

That is, the technical solution provided by the present invention can be further generalized as follows:

A fireman positioning system includes: N radio wave emitting devices, disposed at N corners of a space having N sides for emitting N different frequency modulated signals, wherein N is an integer equal to or greater than 3; and a position receiving device, carried or worn by a fireman, and utilized for receiving the N different frequency modulated signals, wherein the position receiving device 110 is served to demodulate the N different frequency modulated signals via N different carrier signals so as to obtain N different output signals, a phase difference detection is processed to any two of the N different output signals so as to obtain $N*(N-1)/2$ different phase differences, and the position receiving device is served to determine a three-dimensional location of the fireman relative to the N radio wave emitting devices according to at least two of the $N*(N-1)/2$ different phase differences.

Based on what has been disclosed above, advantages achieved by the present invention are as follows:
1. The fireman positioning system of the present invention are able to utilize the plural radio wave emitting devices disposed at a fire scene for assisting to determine a three-dimensional location of a fireman at the fire scene.
2. The fireman positioning system of the present invention are able to utilize the plural radio wave emitting devices disposed at a fire vehicle for allowing a fireman to determine a three-dimensional location at a fire scene through the position receiving device receiving the plural radio wave signals.

Accordingly, the fireman positioning system provided by the present invention is novel and more practical comparing to prior arts.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific examples of the embodiments disclosed and that modifications and other embodiments are intended to be included within the scope of the appended claims. Although specific terms are employed herein, they are used in a generic and descriptive sense only and not for purposes of limitation.

What is claimed is:

1. A fireman positioning system, including:
   a first radio wave emitting device and a second radio wave emitting device, spaced with a predetermined distance and utilized for correspondingly emitting a first frequency modulated signal and a second frequency modulated signal, wherein said first frequency modulated signal is generated through a baseband signal processing a modulating calculation to a first carrier signal, said second frequency modulated signal is generated through said baseband signal processing said modulating calculation to a second carrier signal, said first carrier signal and said second carrier signal correspondingly have a first frequency and a second frequency, and said first frequency is different from said second frequency; and
   a position receiving device, carried or worn by a fireman, and utilized for receiving said first frequency modulating signal and said second frequency modulating signal, and served to demodulate said first frequency modulated signal via said first carrier signal so as to obtain a first output signal, and demodulate said second frequency modulated signal via said second carrier signal so as to obtain a second output signal, wherein a phase difference is formed between said first output signal and said second output signal, and said position receiving device is served to determine a direction angle of said fireman relative to said two radio wave emitting devices via said phase difference;
   wherein the phase difference is determined through a distance difference defined by distances between the position receiving device and the first radio wave emitting device and the second radio wave emitting device.

2. The fireman positioning system as claimed in claim 1, wherein said position receiving device includes a displayer and/or a speaker.

3. The fireman positioning system as claimed in claim 1, wherein said position receiving device includes a button unit and/or a touch control unit.

4. The fireman positioning system as claimed in claim 1, wherein said position receiving device includes a communication interface.

5. The fireman positioning system as claimed in claim 1, wherein said two radio wave emitting devices are disposed in a fire vehicle.

6. The fireman positioning system as claimed in claim 1, wherein said first frequency and said second frequency are both equal to or smaller than 1 GHz.

7. A fireman positioning system, including:
   N radio wave emitting devices, disposed at N corners of a space having N sides for emitting N frequency modulated signals, wherein N is an integer equal to or greater than three; and
   a position receiving device, carried or worn by a fireman, utilized for receiving said N frequency modulated signals and served to demodulate said N frequency modulated signals via N carrier signals so as to obtain N output signals, wherein a phase difference detection is processed to any two of said N output signals so as to obtain $N*(N-1)/2$ phase differences, and said position receiving device is served to determine a three-dimensional location of said fireman relative to said N radio wave emitting devices according to at least two of said $N*(N-1)/2$ phase differences,
   wherein the at least two of said $N*(N-1)/2$ phase differences are determined through a distance difference defined by distances between the position receiving device and the first radio wave emitting device and at least two of the N radio wave emitting devices.

8. The fireman positioning system as claimed in claim 7, wherein said position receiving device includes an information outputting unit, an operation interface and a communication interface.

9. The fireman positioning system as claimed in claim 7, wherein N frequencies of said N carrier signals are all equal to or smaller than 1 GHz.

10. The fireman positioning system as claimed in claim 7, wherein said N radio wave emitting devices are disposed in a fire vehicle.

* * * * *